United States Patent [19]

Koepke et al.

[11] 4,433,980
[45] Feb. 28, 1984

[54] METHOD OF POLISHING SILICA BASE CERAMICS

[75] Inventors: Barry G. Koepke, Mound; Kelly D. McHenry, Eden Prairie, both of Minn.

[73] Assignee: Honeywell Inc., Minneapolis, Minn.

[21] Appl. No.: 431,501

[22] Filed: Sep. 30, 1982

[51] Int. Cl.$^3$ .............................................. B24D 3/02
[52] U.S. Cl. .......................................... 51/308; 51/309
[58] Field of Search ................................... 51/308, 309

[56] References Cited

U.S. PATENT DOCUMENTS

| | | | |
|---|---|---|---|
| 3,715,842 | 2/1973 | Tredinnick et al. | 51/308 |
| 3,768,989 | 10/1973 | Goetzinger et al. | 51/309 |
| 4,226,623 | 10/1980 | Koshiyama et al. | 51/308 |

OTHER PUBLICATIONS

Reinhold, V. N., The Condensed Chemical Dictionary, 8th Ed. 1971, p. 829.
"Mechanism and Application of the 'Mechanochemical Polishing Method Using Soft Powder';" Nobuo Yasunaga, Noboru Tarumi, Akira Obara.
"Mechanochemical Polishing of Single Crystals with Soft Powders", Nobuo Yasunaga, Akira Obara and Osamu Imanaka.
"A New Polishing Technique Using the Mechano--chemical Phenomenon", Nobuo Yasunaga, Osamu Imanaka.
"New Concepts on Surface Finishing and its Application to Ceramics—Recent Progress in Ultra-Fine Finishing in Japan—", Osamu Imanaka, Mamoru Okutomi.

Primary Examiner—Donald E. Czaja
Assistant Examiner—W. Thompson
Attorney, Agent, or Firm—Robert A. Pajak

[57] ABSTRACT

Disclosed is a chemical polishing compound for silica based ceramics.

4 Claims, No Drawings

METHOD OF POLISHING SILICA BASE CERAMICS

The present invention is related to techniques for obtaining polished surfaces on silica based ceramics. Specifically, the present invention discloses a specific polishing agent.

BACKGROUND OF THE INVENTION

In laser technology, there is a long felt need for highly polished surfaces on silica based ceramics such as glass-ceramics and the like. Such materials are commonly employed as transmissive windows in laser structure systems and also as substrates for depositing highly reflective coatings. In many laser systems or structures, it is imperative that any mirror surfaces which form part of the laser structure is highly polished so that light scattering, both forward and backscattering, is minimized.

SUMMARY OF THE INVENTION

In the present invention, a highly polished surface of a silica based ceramic including glasses and glass ceramics is produced by polishing the glass ceramic with strontium carbonate.

DESCRIPTION OF THE INVENTION

Herein, the term "silica based ceramics" refers to any material which has silica (silicon dioxide) as the primary component. Silica based ceramics include glass ceramics such as Cer-Vit and Zerodur which are trade names for two phase ceramics containing a high percentage (e.g. 85% to 90%) of crystalline silica based material with the remainder consisting of glass (non-crystalline). Silica based ceramics also include silica based glasses such as fused silica, soda-lime silicate, and the like.

In the art of polishing, a new term has been introduced known as mechanochemical polishing. Mechanochemical polishing has been presented in the following publications: (i) N. Yasunaga, et.al., Proc. 1st Intern. Conf. Prod. Eng., Tokyo, Japan, (1974), p. 32; (ii) N. Yasunaga and O. Imanaka, Technocrat, Vol. 8, No. 9 (1975); (iii) O. Imanaka and M. Okutomi, Proc. of Symp. on the Science of Ceramic Machining and Surface FInishing II, NBS Spec. Pub. 562, B. Hockey and R. Rice ed. (1979), p. 157; (iv) N. Yasunaga, et.al., ibid, p. 171. This technique is useful since it uses compounds which are softer than the workpiece which is intended to be polished. In the present invention, a mechanochemical polishing compound has been found which provides a high degree of polishing for silica based ceramics without introducing surface damage.

Strontium carbonate has a Mohs hardness of 3 whereas Cer-Vit, specifically C101, is 5.9 Mohs. Thus, strontium carbonate is half as hard as the intended workpiece of Cer-Vit. Since the polishing compound cannot scratch the workpiece, damage free polishing can be carried out dry on a hard surface such as bakelite or the like. Polishing of the Cer-Vit material with the strontium carbonate provides a smooth surface so as to produce very low light scattering.

The new technique, called "mechanochemical polishing," was developed by Prof. O. Imanaka and his coworkers in Japan (1-4) and has been shown to produce smooth, damage-free surfaces on alumina and silicon substrates at surprisingly high rates of material removal (i.e., equivalent to those obtained by lapping with 1 $\mu$m diamond.) The basic concept behind mechanochemical surface finishing is simple. In order to produce a scratch-free surface, an abrasive that is softer than the workpiece must be used. The mechanism of material removal relies on pressure/temperature induced phase changes that occur at the contact points between the abrasive grains and the substrate. The transformed regions are extremely small (i.e., on the order of $10^2$ Å) and the resulting phase, since its properties differ from those of the substrate and abrasive, is removed by subsequent contact with other abrasive grains. The technique offers a number of advantages. First, a polishing cloth is not needed. Polishing can be carried out on standard lapping plates with the result that the substrate does not round off near its edges. Secondly, rates of material removal are high. Yasunaga et.al. showed that ($10\bar{1}0$) surfaces of sapphire crystals polished dry with 0.01–0.02 $\mu$m $SiO_2$ powder exhibited rates of material removal an order of magnitude higher than when polished under the same conditions with 1 $\mu$m diamond abrasive. It was further demonstrated that silicon (111) surfaces could be polished with 2–4 $\mu$m $BaCO_3$ powder on a bakelite surface at rates of material removal equivalent to those produced by 1 $\mu$m diamond on cloth (4).

Polishing silica based ceramics with strontium carbonate can be carried out dry and the compound can be easily washed away afterward since strontium carbonate is partially water soluble. Further, since the compound is so soft, no substrate damage is introduced as a result of the polishing. One method of polishing a silica based ceramic workpiece with strontium carbonate polishing agent comprises lapping the workpiece with the polishing agent by a lapping plate. Of course the usual method of a polishing agent applicator such as a cloth attached to a polishing plate could also be used. The polishing agent can be introduced dry onto the applicator or on the workpiece.

Applying strontium carbonate as a polishing agent to Cer-Vit, the resulting surface prior to mirror coating is so smooth that the resulting mirror produces extremely low light scattering. Further, application of strontium carbonate to fused silica provides an excellent laser window with high transmissivity.

The embodiments of the invention in which an exclusive property or right is claimed are defined as follows:

1. A method of polishing silica based ceramics comprising the step of polishing a silica based ceramic with a strontium carbonate polishing agent.

2. A method of polishing glass ceramics having greater than 50% crystalline structure comprising the step of lapping a silica based ceramic with a strontium carbonate polishing agent.

3. The method of claim 1 or 2 wherein said polishing agent is introduced between a lapping plate and a silica based ceramic workpiece.

4. The method of claim 1 or 2 wherein said polishing agent is introduced between a polishing agent applicator attached to a polishing plate, and a silica based ceramic workpiece.

* * * * *